United States Patent [19]

Brissey et al.

[11] 4,232,772
[45] Nov. 11, 1980

[54] ELECTROMAGNETICALLY CONTROLLED, RESETTABLE HIGH-SPEED SHAFT DISCONNECT

[75] Inventors: George E. Brissey; Glen E. Gathers, both of Erie, Pa.

[73] Assignee: General Electric Company, Wilmington, Mass.

[21] Appl. No.: 867,113

[22] Filed: Jan. 5, 1978

[51] Int. Cl.² .................... F16D 11/04; F16D 27/10; F16D 43/25
[52] U.S. Cl. .................. 192/114 R; 192/56 R; 192/82 T; 192/84 C; 192/93 C
[58] Field of Search ............... 192/56 R, 82 T, 84 C, 192/93 C, 114 R

[56] References Cited

U.S. PATENT DOCUMENTS

| | | | |
|---|---|---|---|
| 614,951 | 11/1898 | Hoffmann | 192/93 C |
| 2,401,864 | 6/1946 | Gerst | 192/93 C |
| 2,887,201 | 5/1959 | Willis | 192/114 R X |
| 3,080,031 | 3/1963 | Young | 192/114 R X |
| 3,306,409 | 2/1967 | Giometti | 192/114 R X |

FOREIGN PATENT DOCUMENTS 63760 7/1945 Denmark ............... 192/114 R

Primary Examiner—Allan D. Herrmann
Attorney, Agent, or Firm—I. David Blumenfeld

[57] ABSTRACT

The disconnect arrangement for high speed aircraft generators includes disconnectable rigid, torque transmitting spring loaded curvic gears coupled between the driving and driven shafts. A plurality of flexibly supported sear members mounted on the driven shaft engage the movable member of the curvic gears. The sears have tapered faces which engage correspondingly tapered shoulders on the movable curvic gear member. The sears are latched to hold the curvic gear members in contact by the armature of an electromagnet. The armature normally rides over the top of the gears maintaining them in contact with the tapered shoulder of the curvic gear member. When the electromagnetic armature is actuated to disengage the driving and driven shafts, the armature moves axially. This removes the retaining force from the tapered sears, allowing them to flex outwardly. The natural separating force of the spring loaded curvic gear, causes the sear to ride upwardly on the tapered surface of the curvic shoulder until the sears and the shoulder disengage. This allows the spring loaded gears to separate terminating transmission of torque from the driving to the driven shaft.

4 Claims, 2 Drawing Figures

ELECTROMAGNETICALLY CONTROLLED, RESETTABLE HIGH-SPEED SHAFT DISCONNECT

This invention relates to a disconnect device, and more particularly, to a resettable device for disconnecting a driven device such as an electrical generator from the driving source such as a gear box, aircraft engine, etc., upon appearance of a malfunction in the system.

Virtually all modern aircraft electrical systems which supply the electrical needs of the craft, incorporate one or more electrical generators which are driven either directly from the engine or through some form of speed reducing gear box. In such aircraft applications, the generators are customarily operated at high speeds which can be in excess of 10,000 RPM. At such high speeds, the appearance of any one of a number of system malfunctions requires that the generator be disconnected from the driving source as quickly as possible in order to avoid serious damage to the generator or other components in the system. For example, aircraft generators normally must be disconnected from the driving source, if there is an actual or incipient generator bearing failure, if there is excessive vibration, engine overspeed, or excessive oil temperature, etc. because all of these conditions are indicative of a situation in which serious damage can occur. Various types of sensors and strategically distributed in the aircraft to sense the occurrence or incipient occurence of any one of these undesirable or potentially dangerous conditions. The sensors generate signals which actuate a disconnect device and produce a visual indication of condition.

Such disconnect devices are either of the resettable or non-resettable. Non-resettable devices include a variety of mechanisms for disconnecting the generator from the driving source by the destruction of a disconnecting element provided for that purpose. Thus, for example, one such device involves rupturing or shearing of one of the shafts, or of an element specially provided for this purpose. In such an arrangement, the shafts or elements are provided with properly dimensioned shear sections to ensure that shearing or rupturing takes place preferentially at this location. Non-settable disconnect devices of the type which involve rupturing or shearing of one of the shafts or elements while effective for disconnect purposes, do have some troublesome aspects. Since shearing of a metallic shaft or members is involved, the energy which must be expended and absorbed in order to produce disconnect may not occur as rapidly as is desired. Furthermore, since shearing or rupturing of a metallic element in a high speed rotating machine is involved, there is always the possibility that metallic fragments may be produced which can be potentially hazardous to the equipment. Furthermore, once disconnected, the machine must be at least partially disassembled and the ruptured or sheared element replaced in order to put the generating system back in operating condition. This involves potentially significant costs.

An alternative approach to a non-resettable device is the use of fusible eutectic members positioned between the driving and driven element. Whenever a condition occurs which indicates the need to disconnect the generator, heat is applied to the fusible member by friction or otherwise, causing it to melt and disconnecting the generator and the driving shaft. However, fusible members can involve dispersion of the melted material beyond the area of disconnect and cause trouble. Again, reassembly of the device is a time consuming and potentially expensive procedure.

Consequently, a need exists for an effective, resettable disconnect arrangement which is rapid, effective and is capable of being operated at high speeds to disconnect a generator or other driven device from a driving shaft.

It is therefore, a principal objective of this invention to provide a resettable shaft disconnect arrangement which is capable of operating efficiently and effectively at high rotational speeds to disconnect a generator from a driving source.

Another objective of the invention is to provide a resettable shaft disconnect arrangement, which is electromagnetically controlled.

Still another objective of the invention is to provide a resettable shaft disconnect arrangement which is highly effective and rapid in operation.

Other objectives and advantages of the invention will become apparent as the description thereof proceeds.

The various advantages and objectives of the invention may be realized in a disconnect mechanism which consists of a rigid, spring-loaded curvic gear coupling disposed between the driving and the driven members. The movable curvic gear is normally latched to maintain the coupling in engagement for torque transmission between the drive shaft and driven shaft. The movable member of the coupling is latched by a plurality of radially movable sears. Each of the sears has a tapered surface which engages a corresponding tapered, circumferential shoulder on the movable curvic gear. The searers are normally latched against radial movement by an armature of an electromagnet, thus exerting an axial clamping force on the movable coupling member. When the electromagnet is energized in response to the signal indicating a dangerous condition, the armature member moves axially releasing the sears. the spring-loaded, curvic gears are forced outward, causing the tapered sears to ride upward, along the tapered shoulder of the movable coupling member until they ride over the shoulder. This allows the movable coupling to move axially disengaging the coupling and terminating transmission of torque.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
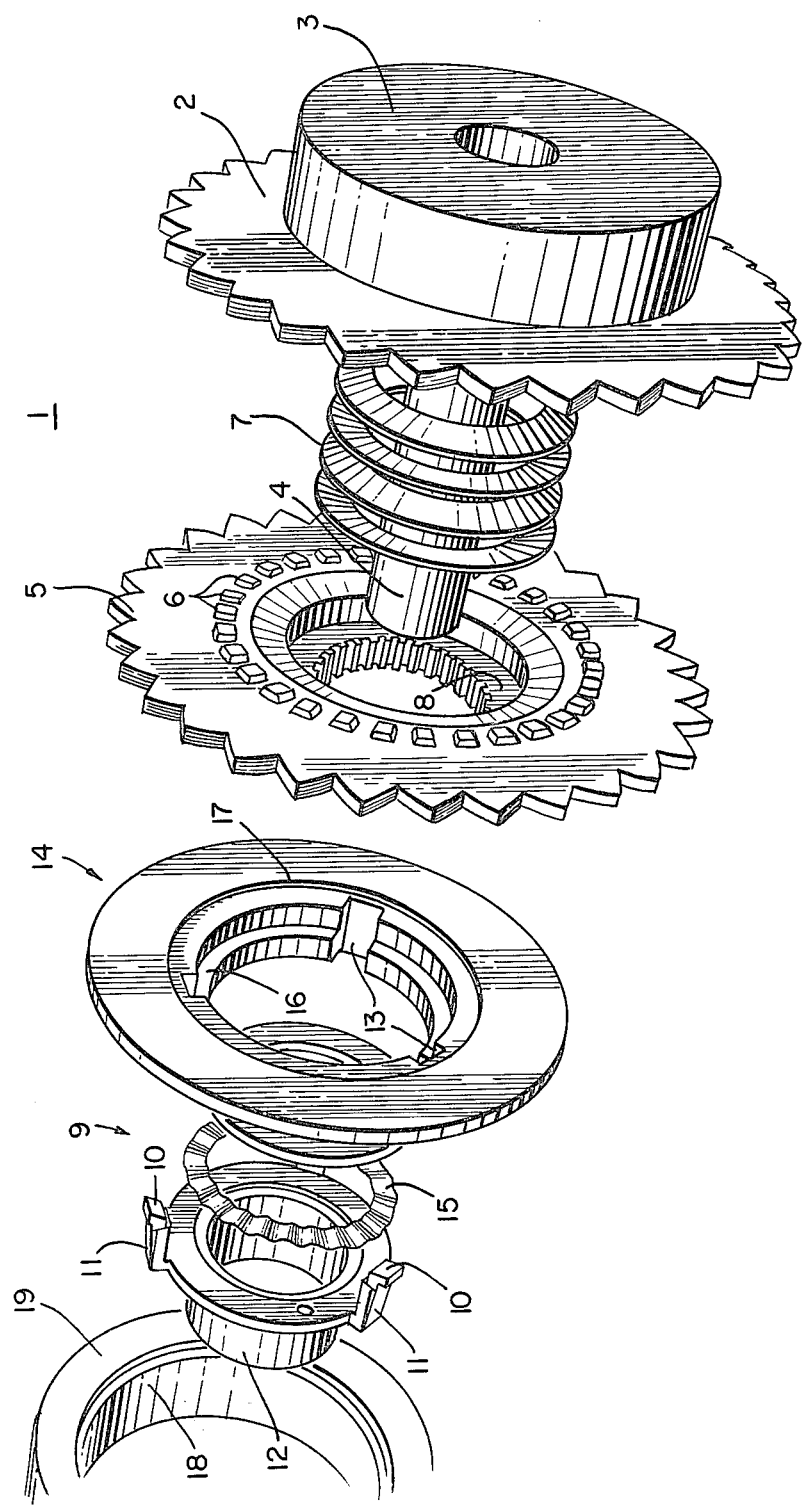
FIG. 1 is an exploded view of the disconnect mechanism and the coupling.

FIG. 1 shows the high speed disconnect device of the instant invention which controls a rigid, torque transmitting, spring loaded, curvic gear coupling 1. Coupling 1 includes a rotating, axially fixed curvic gear 2 attached to a hub 3 and a hollow internally splined shaft 4 through which the driving shaft, not shown, passes. Curvic gear 2 engages a rotating, axially movable, curvic gear 5 which has circumferentially disposed clutch teeth 6 which engage similar gear teeth, not shown on gear 2. A Belville spring 7 is disposed between gear 2 and interior shoulder 8 on gear 5. Spring 7 thus exerts an outward axial force on the gear tending to separate the coupling.

Coupling 1 is controlled by an electromagnetically actuated disconnect 9 which includes a plurality, preferably at least 3, of tapered sears 10 secured by flexible springs 11 to a sear support 12. Sears 10 pass through openings 13 in electromagnet armature 14 and engage a circumferential tapered shoulder, not shown, but presently to be described in connection with FIG. 2 on the outside of curvic gear 5. An armature return spring 7 is positioned between armature 14 and sear support 12 and aids in repositioning the armature and the sears when the assembly is reconnected. Armature 14 has an interior shoulder 16 and notch 17 which ride over the upper surface of sears 10 preventing them from flexing outwardly. This maintains the sears in engagement with the tapered shoulder on curvic gear 5 exerting an axial force which opposes that of spring 7 so that coupling 1 is rigidly connected to transmit torque.

Armature 14 is controlled by an electromagnet which includes a toroidal coil 18, armature 14 and magnetic return path 19. This moves armature 14 to the left thereby releasing sears 10 and permitting them to flex outwardly. The axial force exerted by Bellville spring 7 and the curvic teeth cause tapered sears 10 to move upwardly along the tapered shoulder of curvic gear 5 until it moves out of engagement with the shoulder. This moves coupling member 5 axially away from gear member 2 disengaging the coupling and terminating torque transmission until the electromagnet is deenergized and armature 14 and sears 10 are relatched to reengage coupling 1.

Figure 2:
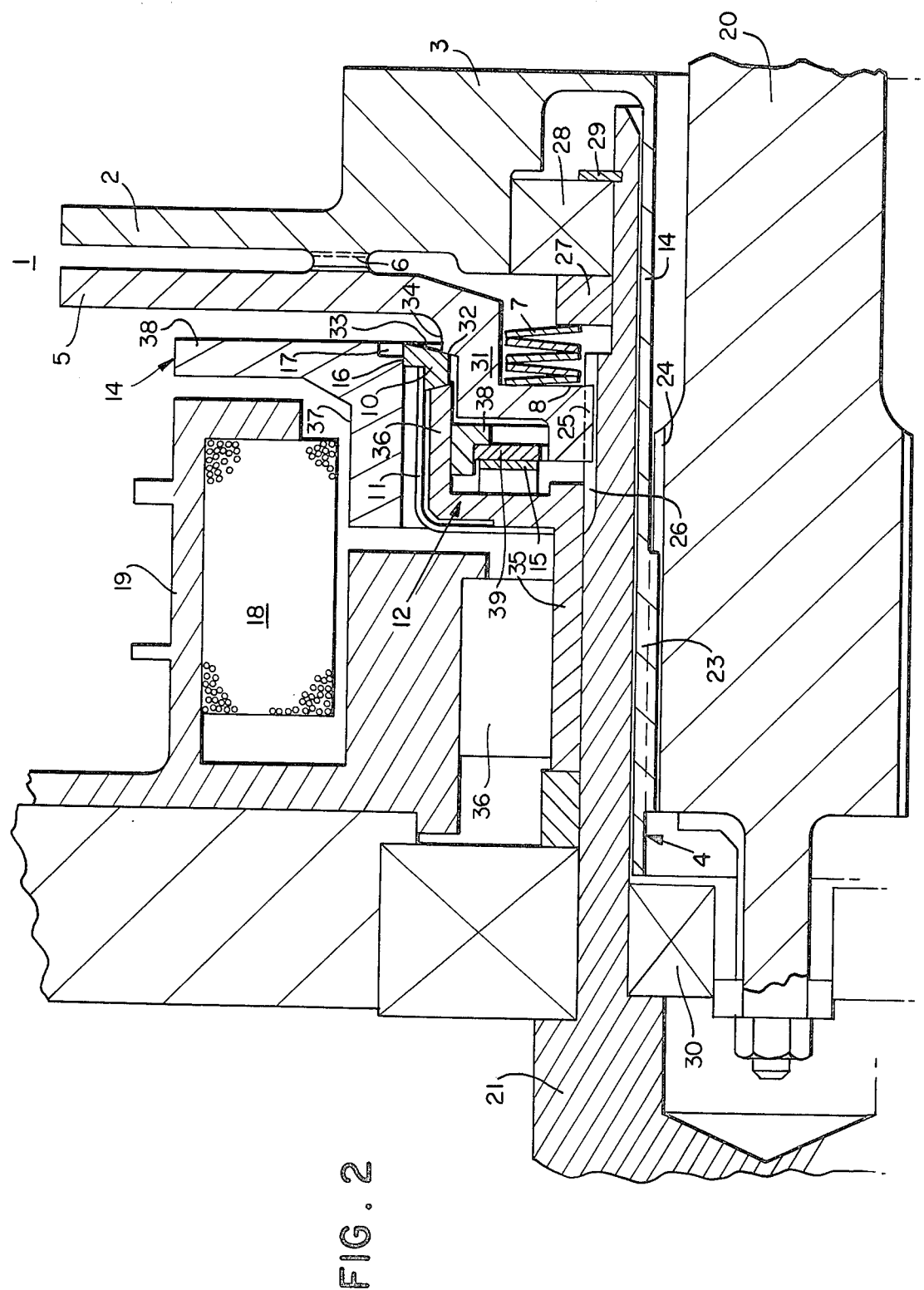
FIG. 2 is a vertical section taken through a disconnect device constructed in accordance with the instant invention.

FIG. 2 shows a sectional view of the assembled device.

A drive or stub shaft 20 is connected to a driving source power such as the engine of an aircraft, not shown, or a speed-reducing gear box, also not shown. Shaft 20 is connected by means of hollow shaft 4 and hub 3 to curvic gear 2 to permit transmission of torque to generator shaft 21 when torque-transmitting coupling 1 is engaged. Hollow shaft 4 is internally splined at 23 and engages splines 24 on driving shaft 20. Curvic gear 2 is rigidly attached to hub 3 so that torque is transmitted from shaft 20 to curvic gears 2 and 5. Movable curvic gear 5 has an internally splined hub 25 which engages splines 26 on generator shaft 21. Thus, when curvic gears 2 and 5 of coupling 1 are held in engagement by sears 10 and armature 14, torque is transmitted from shaft 20 to generator shaft 21. Curvic gears 2 and 5 are spring loaded by Bellville spring 7 which is positioned between interior shoulder 8 of gear 5 and a C-ring 27 attached to shaft 21. Curvic gear 2 is supported for rotation on the outer race of a ball bearing 28 which is positioned between C-ring 27 and another C-ring 29. Drive shaft 20 is similarly journalled in a bearing 30 disposed between it and generator shaft 21.

The spring-loaded, torque transmitting coupling 1 is controlled by the electromagnetic disconnect which normally maintains curvic gear element 5 in engagement with gear 2 to transmit torque between the driving and driven shafts. The electromagnet controls armature 14 which latches sears 10. Curvic gear 5 has a hub 31 which includes a tapered sear retaining shoulder 32 against which the tapered surface 33 of sear 10 rests when the gears are engaged. Hub 31 also includes a ledge 34 on which sears 10 are positioned when actuation of armature 14 permits the sears to flex outwardly. Sears 10 are supported by flexible springs 11 which are mounted on and attached to sear support 12. Sear support 12 includes a hollow hub 35 which is coaxial with and is slidably supported between generator shaft 21 and seal 36. Sear support 12 has L-shaped sear support members or fingers 36 which extend through passages 13 in armature hub 37. Hub 37 has an internal shoulder 38 which presses against a C-ring 39 which retains armature return spring 7 between L-shaped sear supports 36 and shoulder 38. Spring 7 aids in repositioning the armature when Electromagnet is deenergized to relatch the sears. Armature 14 also has a disc-shaped face portion 38 which cooperates with return iron path 19 to move armature 14 axially whenever coil 18 is energized. Curvic gear couplings are readily available commercial items and include a plurality of curved clutch teeth positioned circumferentially around the elements. The teeth are arc-shaped in nature so that a force is exerted during torque transmission which causes the teeth to ride upwardly and outwardly. In addition, Bellville spring 7 also exerts an axial force tending to separate the gears. The combination of the Bellville spring and the clutch teeth tends to separate the torque transmitting gears unless retained in the engaged position by sears 10 acting against tapered shoulder 32. In operation, curvic gear coupling 1 is engaged by positioning sears 10 so that the tapered face 33 of each sears engages tapered shoulder 32 on the hub on curvic gear 5. Armature 14 is positioned so that the hollow interior of armature 37 passes over the sears thus pressing them downward and into engagement with shoulder 32. With sears 10 in the latched position through the action of armature 14, curvic coupling 1 is a rigid, torque-transmitting assembly and torque from drive shaft 20 is transmitted through internally splined shaft 4 to curvic coupling gear 2 which engages movable gear 5. Torque is thus transmitted through the rigid curvic coupling 1 to hollow generator shaft 21 through splines 26 which engage splines 25 on curvic gear 5. As long as the armature presses the sears down an axial force is exerted by sears 10 on curvic gear 5 which opposes the axial force in the opposite direction due to the clutch teeth on the curvic coupling and Bellville spring 7.

Whenever an actual or potential malfunction, such as excessive vibration, heat, etc., is sensed, toroidal coil 18 is energized and armature 14 is actuated moving it axially to the left. As the armature moves to the left, the latching force which presses the sears down and against tapered shoulder 32 is removed. Centrifugal force due to rotation, and the flexible nature of springs 11 allows sears 10 to flex outwardly. The axial force exerted by the curvic teeth and Bellville spring 15 forces tapered surface 33 of sears 10 to ride upwardly on tapered shoulder 32 until the sears pass up over the shoulder and onto ledge 34. This releases the restraining axial force which has maintained movable curvic gear 5 in engagement with gear 2. The axial force due to spring 7 and the clutch teeth moves gear 5 axially disengaging coupling 1 and terminating torque transmission.

Movement of armature 14 to the left by actuation of the electromagnet also forces shoulder 38 of armature hub 37 against C-ring 39 compressing armature return spring 7 against sear support member 12. As long as the electromagnet is energized and maintains armature 14 in its actuated position, shoulder 38 compresses spring 7. When the electromagnet is deenergized, reengagement is to be provided, spring 7 forces armature 14 axially to the right. This pushes curvic gear 5 to the right until sears 8 drops off ledge 34 and into engagement with tapered shoulder 32. The armature hub now passes over the top of the sears and forcing them down. This relatches the assembly and exerts an axial force on curvic gear 5. Thereafter, torque is again transmitted through the curvic coupling.

From the foregoing description, it can be readily appreciated that a simple, rapid, and effective resettable disconnect mechanism for a generator, and particularly for foreign aircraft generators, has been provided which is capable of disconnecting the generator from the driving source rapidly and efficiently at high speeds to prevent damage to the generator and to the system, at the same time, providing an arrangement which may be reassembled with minimum difficulty.

While a resettable disconnect mechanism has been described, in what is presently considered to be a preferred embodiment of the invention, it will be apparent to those skilled in the art that various changes and modifications may be made in the structure and in the instrumentalitites utilized without departing from the spirit and scope of the invention.

What is claimed as new and desired to be secured by Letters Patent of the United States is:

1. In a resettable disconnect adapted to connect driving and driven members in a power transmission system, the combination comprising,
   (a) a disengagable spring loaded, torque transmitting coupling disposed between the driving and driven members, said coupling having an axially moveable member and an axially fixed member;
   (b) means for maintaining said axially moveable and axially fixed members engaged to transmit torque through said coupling, including;
      1. radially moveable means having a tapered surface for contacting a tapered shoulder on the axial axially moveable coupling member to exert axial force on said axially moveable member to maintain it in engagement with said axially fixed member against the separating force of spring loaded coupling,
      2. cantilever spring means supporting said radially moveable member to allow centrifugal force to flex said spring and move said means with tapered surface radially outward and along the said tapered shoulder,
      3. latching means to prevent said spring means from flexing outwardly thereby maintaining the radially moveable means in contact with said axially moveable member;
   (c) means responsive to a malfunction or incipient malfunction in the system to disable the latching means to permit flexing of said spring means and movement of the tapered face of said radially moveable means outwardly and along the tapered shoulder on said axially moveable member in response to the separating force of said spring loaded coupling to release said coupling and terminate torque transmission.

2. The resettable disconnect according to claim 1 wherein said latching means is part of an electromagnet.

3. The resettable disconnect according to claim 1 which includes a plurality of radially moveable members having tapered surfaces engaging said tapered shoulder at a plurality of points.

4. The movable disconnect according to claim 2 wherein said latching means includes an electromagnet, the armature of said electromagnet being in contact with the radially moveable means to prevent them from flexing outwardly when said electromagnet is deenergized.

* * * * *